United States Patent Office 3,248,905
Patented May 3, 1966

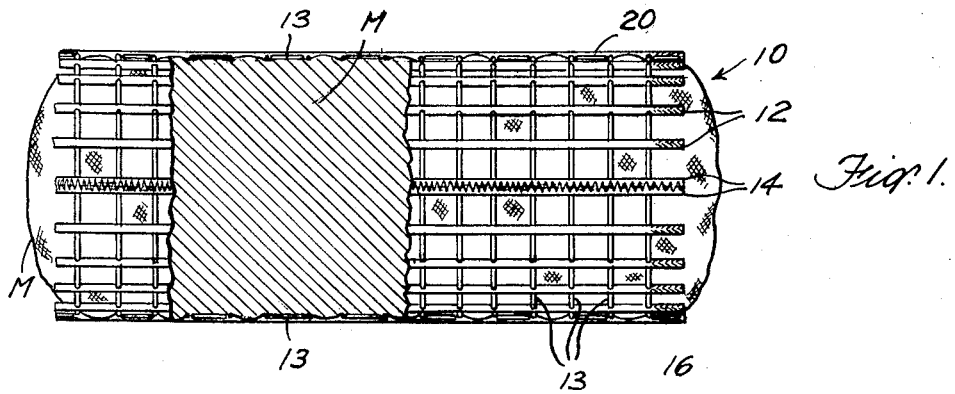
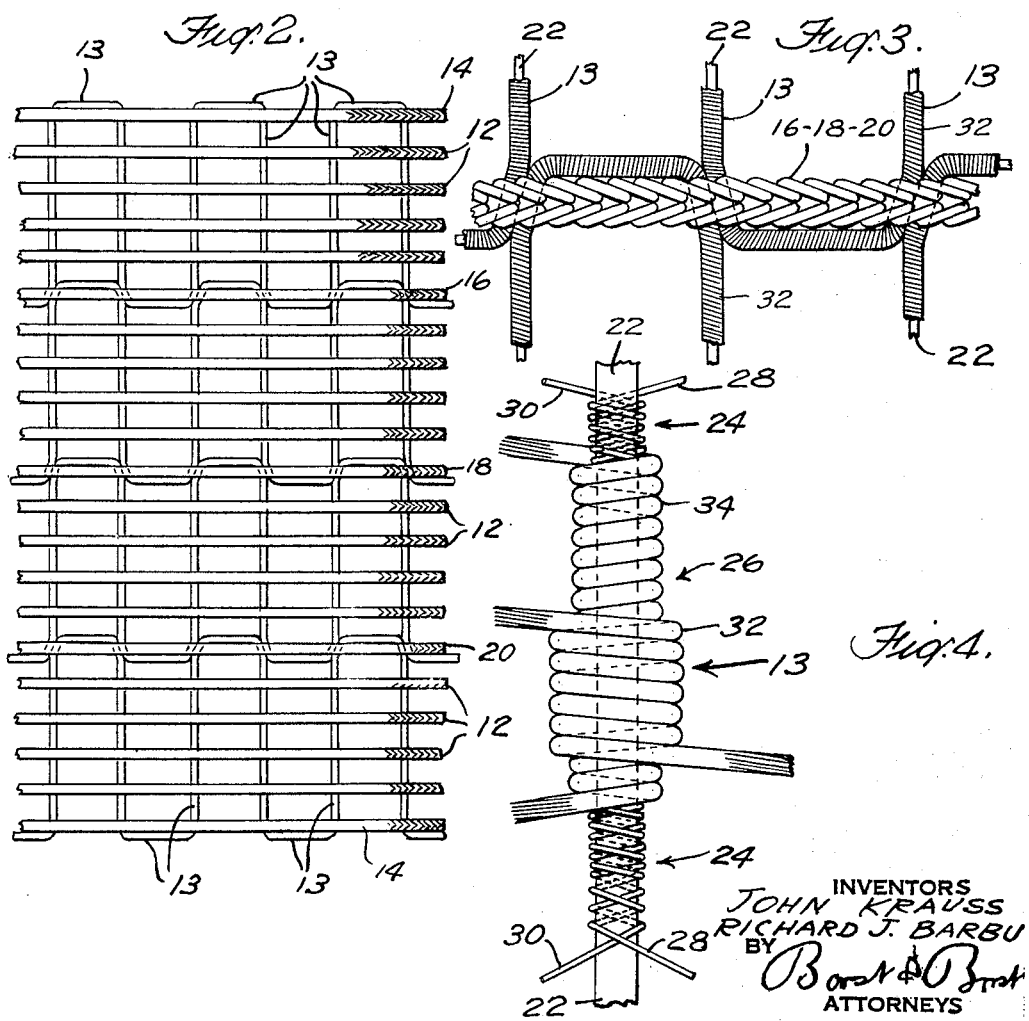

3,248,905
MEAT CASING
John Krauss, Jamaica Estates, and Richard J. Barbu, Lindenhurst, N.Y., assignors to Markbar Corporation, Garden City, N.Y., a corporation of New York
Filed Aug. 17, 1964, Ser. No. 389,837
2 Claims. (Cl. 66—192)

This invention relates to receptacles and, in particular, to casings for food products which are introduced into the oven with the food product contained therewithin for roasting purposes.

There are some forms and cuts of meat products which cannot be roasted unless they are held tightly compacted during the cooking process. Otherwise, it has been found, the meat tends to crumble and fall apart while roasting and emerges from the oven in a form which is unsightly in appearance and difficult to serve. Hitherto, the solution to this problem has been to encase the meat in a netted receptacle composed in part of elastic cords that are snugly covered by a single covering made from, for example, cotton or cotton and nylon thread. The special problem that such a container raises involves the use of elastic and its tendency under heat to flake off into the meat while the meat is in the roast. It would therefore seem desirable to design the netted material to prevent flaking of the elastic in the roasting process.

To this end the invention contemplates a meat container adapted to assume a tubular conformation and made in netted form of elastic and non-elastic material which will be safe to use in roasting the meat contained therewithin.

One object of the invention is therefore, to provide a netted casing for meat being cooked which is safe to use and economical to manufacture.

Other objects and advantages may be appreciated on reading the description below of one embodiment of the invention which is taken in conjunction with the accompanying drawings, in which:

FIGURE 1 is a side elevation showing the meat product within the netted casing with a portion in section;

FIGURE 2 is a fragmentary enlarged view showing the details of the construction of the casing in development form;

FIGURE 3 is a detail illustrating the means of connecting the longitudinal and circumferential strands on an enlarged scale;

FIGURE 4 is an enlarged detail view showing the construction of the elastic strands.

Referring to the drawings, the meat receptacle 10 having front and rear faces is netted in form and can be fabricated exclusively by knitting. Its longitudinal strands 12 are composed of knitted chains of ways stitches which are non-elastic. As shown in FIGURE 2 the circumferential cords 13 are composed of four independent strands, each containing a rubber core, which extend the entire length of the casing being looped respectively between flat seam 14 and longitudinal strand 16, the latter and longitudinal strand 18, the longitudinal strand 18 and longitudinal strand 20, the strand 20 and the seam 14.

The circumferential cords 13 have an elasticized rubber core 22 which shrinks as it is heated. Each core is enveloped by an inner covering layer 24 and an outer covering layer 26. The inner covering layer 24 consists of a single filament, left hand wound thread 28 and a single filament right hand wound thread 30. The outer covering layer 26 comprises a left hand thread 32 composed of four filaments and a right hand thread 34 also composed of four filaments.

When the receptacle is stuffed with meat M, and stretched as shown in FIGURE 1, it may be appreciated that the threads of each covering in the circumferential cords being wound in opposite turns tend to move together and prevent exposure of the elastic core which tends to contract on exposure to heat.

Various modifications to the invention may be effected by persons skilled in the art without departing from the scope and principle thereof as defined in the appened claims.

We claim:
1. A food receptacle for containing food being cooked comprising a netted fabric adapted to assume a tubular shape, said fabric being composed of circumferential and longitudinal strands, one of said strands having an elastic core and a double layer of covering therefor which affords continuous and uninterrupted protection for said core under stretch conditions, each of said covering layers being composed of right and left hand wound threads with adjacent coils of thread in each layer in continuous contact with each other, the outer covering layer threads each comprising a plurality of filaments.

2. A receptacle as defined in claim 1 in which each of the threads in the outer layer is composed of a plurality of filaments.

References Cited by the Examiner
UNITED STATES PATENTS

| | | |
|---|---|---|
| 1,749,776 | 3/1930 | O'Lena. |
| 1,828,668 | 10/1931 | Kern _____ 99—174 |
| 2,518,407 | 8/1950 | Weinberg _____ 66—193 |
| 2,587,117 | 2/1952 | Clay _____ 66—193 X |
| 3,178,910 | 4/1965 | Hammerle _____ 66—170 |

DONALD W. PARKER, *Primary Examiner.*
RUSSELL C. MADER, *Examiner.*
P. C. FAW, *Assistant Examiner.*